Patented Oct. 19, 1954

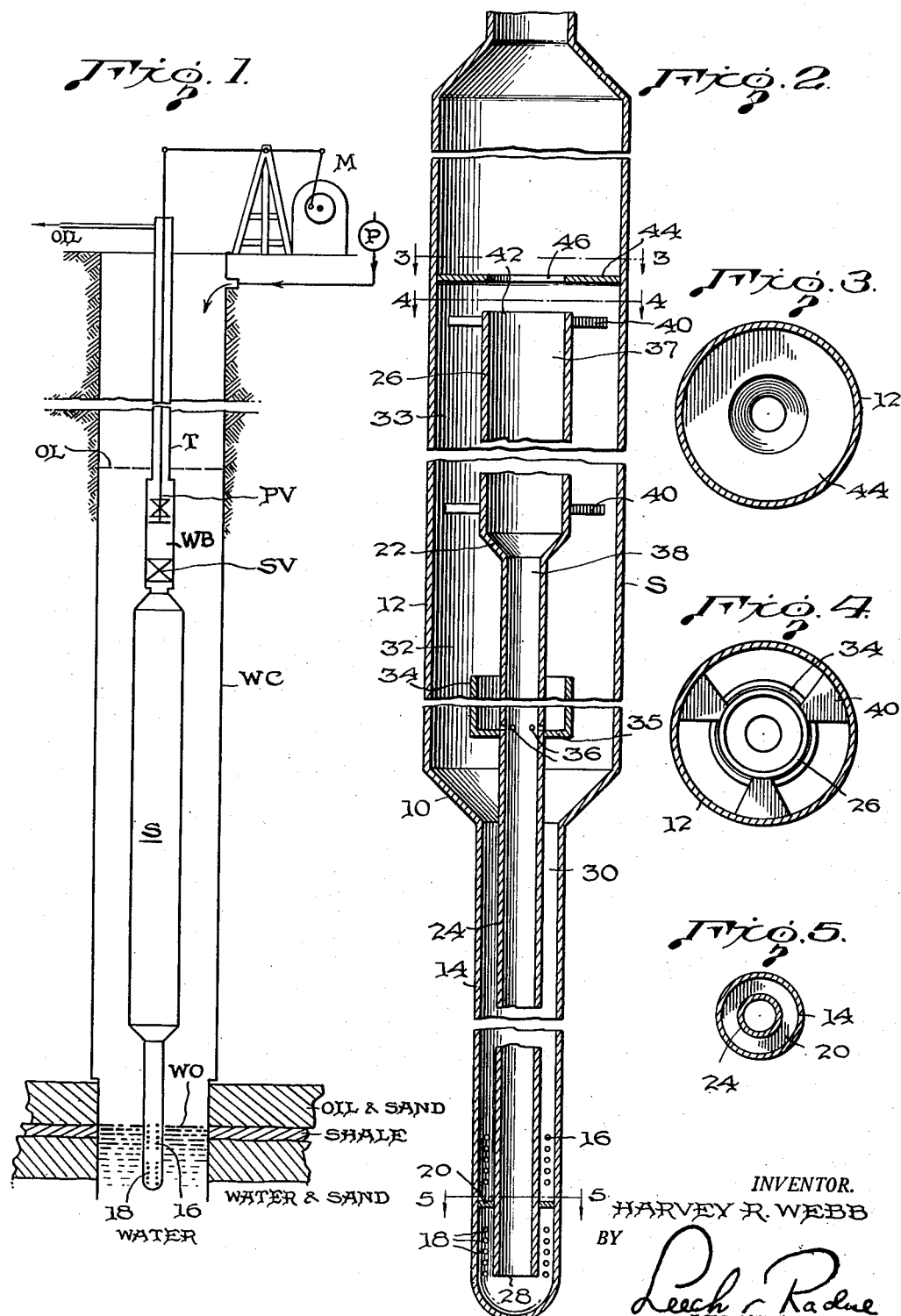

2,692,051

UNITED STATES PATENT OFFICE 2,692,051

WATER AND OIL SEPARATOR

Harvey R. Webb, Tyler, Tex.

Application January 19, 1951, Serial No. 206,747

6 Claims. (Cl. 210—51)

This invention relates to oil well pumping and particularly to a method of and means for separating oil and water below the surface of the ground so that only oil is produced at the surface and the water is returned to the formation from which it came.

In oil well operation large quantities of water are sometimes obtained along with the oil. This is particularly true when the oil well is making bottom hole water. The pumping, separation, and disposition of this water is an expensive operation which should be kept to a minimum.

It is a general object of this invention to provide an oil well pumping system in which the water is removed from the water-oil mixture prior to its reaching the ground surface.

Another object of this invention is to eliminate the pumping of water to the surface to thereby avoid many problems and expenses.

Still another object is the design of a separator for accomplishing the above which has no moving parts, the entire separation process being brought about by the passing of the water and oil through a series of passages of varying diameters and into contact with a baffle within the separator.

A further object of the invention consists in the provision of means within the separator for carrying off the water which is separated from the oil-water mixture.

Other objects and advantages of this invention will be brought out in the following specification and drawings wherein:

Fig. 1 is a schematic view of the separator and oil well pumping system as it would be used in normal well operation;

Fig. 2 is a vertical section of the separator on an enlarged scale;

Fig. 3 is a horizontal section taken along line 3—3 of Fig. 1;

Fig. 4 is a horizontal section taken along line 4—4 of Fig. 1; and

Fig. 5 is a horizontal section taken along line 5—5 of Fig. 1.

The principle used in separating the oil and water in this separator is well known, being based on the concept that mixed liquids of different specific gravities can be made to separate from each other by mere force of gravity, the heavier component merely settling out. This same idea may also be applied to moving liquids of different specific gravities. There is a certain velocity above which the heavier component will not settle out, this velocity we will call the "critical carrying velocity." The rate at which the heavier component will settle out increases as the velocity of the moving mixture decreases below the "critical carrying velocity," the maximum rate being reached when the mixture is not moving. As a matter of interest it might be noted that the "critical carrying velocity" of free water in petroleum type oil is generally somewhere between 2.0 and 3.0 feet per minute.

This principle has been used in devising this separator wherein a mixture containing two components of different specific gravities enters the separator and is carried a short distance in same at a speed well above the "critical carrying velocity" and then enters a passage of larger cross-section where the speed is reduced slightly below the "critical carrying velocity" and thus limited settling out takes place, the remaining mixture moving upward to another zone where the speed is further reduced, and with the aid of a baffle used for deflecting the heavier component downward, all of the heavier constituent is removed, thus allowing the lighter element to be drawn upward and out to the surface.

Fig. 1 shows a general arrangement of the apparatus used in a normal well pumping operation wherein a well casing WC extends from the ground surface down into the oil bearing formation such as the oil and sand, shale and water and sand strata shown. Conduit means within the well casing extend from the surface down below the fluid level OL where said conduit means connect with the separator S which extends down into the water below the oil as shown. These conduit means include well tubing T and working barrel WB having valved pump plunger PV and stationary valve SV carried therein. A motor M acts through a system of levers comprising a jack to operate the pump plunger to lift the oil from the well at a substantially fixed rate after it is separated from the water. Centrifugal pump P is used to feed back a quantity of oil into the wall casing sufficient to maintain the water-oil level within the well bore at the desired position, this position being the water-oil contact level within the formation.

Fig. 2 shows a vertical section of the separator S which comprises outer shell 10 having a section 12 of large diameter connected to a lower portion 14 of reduced diameter closed at the lower end except for two bands of holes or perforations 16 and 18. An inner tube 22 having an upper section 26 of large diameter and a lower section 24 of reduced diameter is positioned within casing 10 with its lower end a short distance above the closed bottom section 14. A disc 20 is positioned in the annular space 30 defined by the casing 14 and inner tube 24 as shown in Fig. 5 and is vertically located between the perforations 16 and 18. A series of horizontally arranged holes 36 is located midway the length of tube 24. A hopper 34 surrounds tube 24 and has its closed end 35 located just below holes 36.

Two series of lugs 40 hold the inner tube 22 in proper spaced relation with outer shell 10. These lugs are positioned equidistant around tube 26 as shown in Fig. 4 and are vertically spaced as shown in Fig. 2. A circular apertured baffle 44 is placed within outer shell 14 just above the open end 42 of the inner tube 26.

In operation, the separator S is so positioned within the well casing WC that the topmost perforations 16 in outer shell 14 are at the water-oil level WO within the formation. This setting may be determined by using a suitable electric-log. The surface pumping equipment is next put in operation thus causing a pressure differential to be placed on top the separator thereby causing oil and water to be drawn in through perforations 16, up through annular space 30 at a velocity above the critical carrying velocity of the water. From space 30 the water and oil travel into an enlarged space 32 having a cross-section which is of such a ratio to the cross-section of space 30 that the velocity of the water and oil drops slightly below the critical carrying velocity of the water, thereby causing a portion of the water to drop downwardly and be caught in hopper 34. From here the water flows through perforations 36 into water discharge passage 38 and out through the end 28 of the passage 38 into the bottom portion of the outer shell and out through perforations 18. Following removal of a portion of the water from the water and oil flowing in space 32, the remaining water and oil passes into space 33 where the velocity is further reduced and with the aid of baffle 44 which deflects this liquid stream and remaining water is separated out, flowing down through water discharge passage 37 into passage 38 and on out as previously noted. The oil which has had the water component removed passes through 46, out the top of the separator into the working barrel, then into the well tubing and on out to the surface for storage. A predetermined amount of oil is pumped back into the well casing by pump P so as to maintain the water-oil level within the well casing the same as the water-oil contact in the formation. As shown in Fig. 1 the water-oil level in the well coincides with the water-oil level of the formation.

Obviously since the principle used in separating the water from oil in this separator depends basically on varying the velocity of the mixture, the relative dimensions of the various components of the separator are of particular importance. Given a constant pumping volume the ratios of the diameters of the inner and outer tubes must be such that the flow through the lower section will be over the critical carrying velocity of the water while the flow through the upper section must be such that the velocity of the liquid coming from the lower section will be reduced to some point below this critical carrying velocity. The diameter of the inner tube which is used to carry the separated water down and out of the separator must be such that it will handle the total volume of separated water and cooperate with the various diameters of the outer shell to achieve the above mentioned results. It is therefore apparent that the several tube diameters may be varied over a wide range as long as the necessary ratios are maintained. In connection with the height of the separator the only requirement is that the length of the several separator sections must be such that the desired amount of separation may take place therein before the mixture is moved to the next stage in the separation process.

While this separator has been described as being used in oil wells which are pumping both oil and water it is obvious that it could be used in many similar instances where it is desired to separate liquid components of different specific gravities.

What I claim as new and desire to secure by Letters Patent is:

1. A separator for extracting oil from a formation containing both oil and water comprising an outer shell adapted to have its upper end connected with a pump intake, the lower portion of said shell having a discharge opening, said lower shell portion having inlet holes above the discharge opening for immersion in a water-oil mixture, an inner shell within said outer shell and having open upper and lower ends, a disc disposed in the annular space defined by the outer and inner shells and below said inlet holes, hopper means surrounding the inner shell, means to drain the hopper into the inner shell, said shell diameters adjacent said hopper being such as to increase the annular area between them beyond that below the hopper to reduce upward flow rate of the mixture, and baffle means within the outer shell spaced above the upper end of the inner shell.

2. A separator for extracting oil from a formation containing both oil and water comprising an outer shell adapted to have its upper end connected with a pump intake, the lower portion of said shell having a discharge opening, said lower shell portion having inlet holes above the discharge opening for immersion in a water-oil mixture, an inner shell within said outer shell and having open upper and lower ends, a disc disposed in the annular space defined by the outer and inner shells and below said inlet holes, hopper means surrounding the inner shell, the inner shell having holes therethrough for draining the hopper, said shell diameters adjacent said hopper being sized to increase the annular area between them beyond that below the hopper to reduce upward flow rate of the mixture, and baffle means secured within the outer shell above the upper end of the inner shell and positioned to deflect the mixture flowing in the annulus between the shells.

3. A separator comprising an outer elongated shell closed at the bottom and having two vertically spaced sets of holes adjacent said bottom, an inner tube member open at each end and carried within said elongated shell, a disc disposed in the annular area defined by the outer shell and inner tube and vertically positioned between the two sets of holes in the outer shell, a hopper with its lower closed end surrounding said inner tube, the inner tube having holes therethrough above the closed end of said hopper, and a circular apertured baffle secured within the outer shell above the inner tube.

4. A separator comprising an elongated outer shell having connected upper and lower portions, said lower portion being of reduced diameter and having a series of vertically spaced holes adjacent its lower extremity, an inner tube open at both ends having upper and lower portions carried within the outer shell, said upper portion being of larger diameter than the lower portion and terminating below the upper end of the upper portion of the outer shell, a disc closing the space defined between the inner tube and outer shell vertically positioned between the aforesaid outer tube hole series, the lower portion of the inner tube having holes therethrough at a level above the junction of the upper and lower portions of the outer shell, a hopper having its lower closed end surrounding the lower portion of the inner tube just below the aforesaid holes therein, and a baffle secured within the outer shell above the upper extremity of the inner tube.

5. A separator comprising an elongated outer shell having connected upper and lower portions, said lower portion being of reduced diameter, closed at the bottom and having two series of vertically spaced apertures adjacent its lower extremity, an inner tube in the outer shell and having an upper portion and a lower portion of reduced diameter, the lower end of said tube being open and maintained a short distance above the bottom of the outer shell, the top of the tube terminating within the upper portion of the outer shell, a disc closing the space defined between the inner tube and outer shell between the aforesaid series of outer tube holes, the reduced diameter portion of the inner tube having holes therethrough at a level just above the junction of the upper and lower portions of the outer shell, a hopper having its lower closed end surrounding the reduced diameter portion of the inner tube just below the aforesaid holes, means spacing the inner tube and outer shell, and an annular baffle secured within the outer shell above the upper extremity of the inner tube.

6. A separator for extracting oil from a formation containing both oil and water comprising an outer shell adapted to have its upper end connected with a pump intake, the lower portion of said shell having a discharge opening, said lower shell portion having inlet holes above the discharge opening for immersion in a water-oil mixture, an inner shell within said outer shell and open at both ends, a disc disposed in the annular space defined by the outer and inner shells and below said inlet holes, hopper means spaced above the holes and surrounding the inner shell, said hopper having means for draining it into the inner shell, said shell diameters adjacent said hopper being such as to increase the annular area between them beyond that below the hopper to reduce upward flow rate of the mixture, whereby some of the water in the mixture settles into the hopper and is discharged through the bottoms of said shells.

References Cited in the file of this patent

UNITED STATES PATENTS

| Number | Name | Date |
|---|---|---|
| 1,279,758 | Putnam | Sept. 24, 1918 |
| 1,553,973 | Ballou | Sept. 15, 1925 |
| 1,673,663 | Chancellor et al. | June 12, 1928 |
| 2,142,376 | Rodgers | Jan. 3, 1939 |
| 2,214,064 | Niles | Sept. 10, 1940 |
| 2,281,801 | Reynolds et al. | May 5, 1942 |
| 2,336,150 | Horvath | Dec. 7, 1943 |